March 29, 1966 F. D. HICKEY 3,243,264
APPARATUS FOR CONTINUOUSLY EXTRACTING PRODUCTS
FROM SOLID MATERIALS
Original Filed March 28, 1960
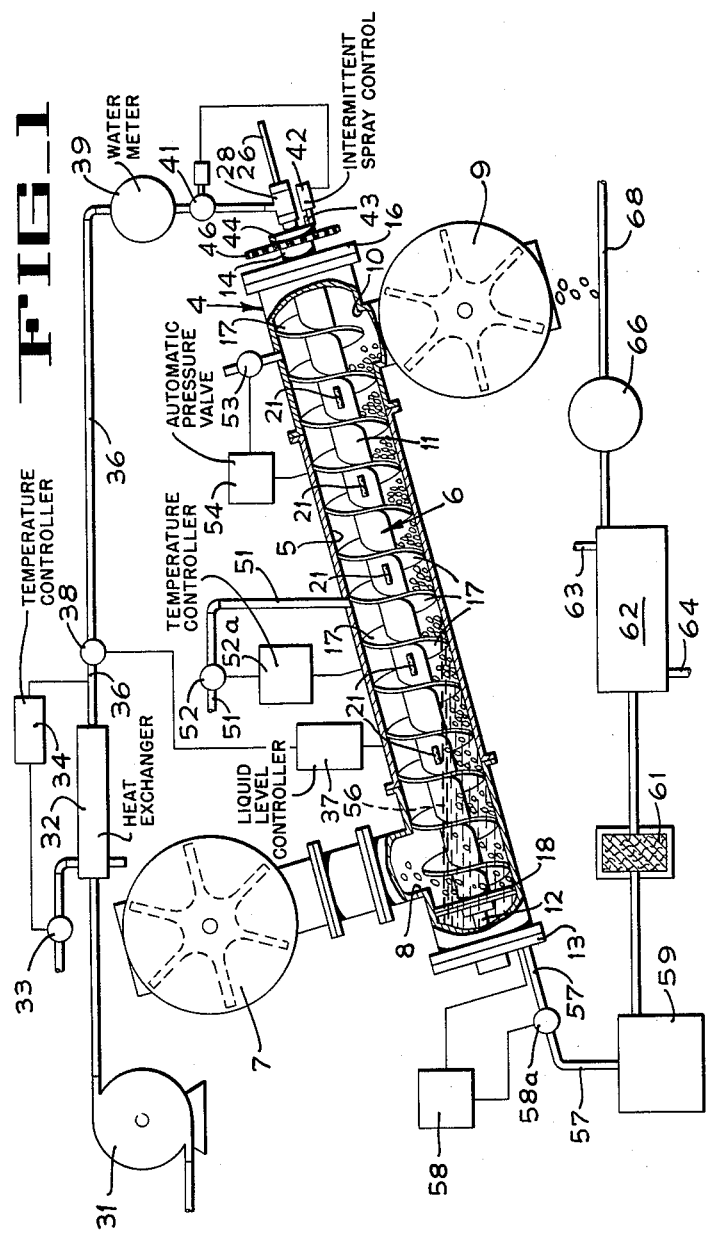
INVENTOR
FRANK D. HICKEY
BY *Hans G. Hoffmeister*
ATTORNEY

United States Patent Office 3,243,264
Patented Mar. 29, 1966

3,243,264
APPARATUS FOR CONTINUOUSLY EXTRACTING PRODUCTS FROM SOLID MATERIALS
Frank D. Hickey, San Jose, Calif., assignor to FMC Corporation, San Jose, Calif., a corporation of Delaware
Original application Mar. 28, 1960, Ser. No. 17,918. Divided and this application June 5, 1964, Ser. No. 372,997
3 Claims. (Cl. 23—270)

The present invention appertains to continuous extraction systems, and more particularly relates to a continuous apparatus for extracting products from solid material by treating the solid material with a solvent under high temperature and pressure.

This application is a division of my copending application, Serial No. 17,918, now abandoned which was filed on March 28, 1960.

It is well known that a product, such as the extract of coffee which is used in powder form for making instant coffee, is more readily removed from its solid carrier when the solid is maintained at a high temperature and pressure. It has not been known, however, that an intermittent, high pressure flow of fresh, heated solvent through the heated solid could be effective to remove a much greater percentage of extract from the solid than heretofore possible without unduly diluting the resulting solution. Although a high pressure flow of solvent is effective in washing the extract from the solid, it is desirable to use as little fresh solvent as possible for economy reasons and so that a high percentage of extract will be present in the solution when the solution is removed from the processing chamber.

It is, therefore, one object of the present invention to provide an improved apparatus for withdrawing an extract from a solid.

Another object is to provide a continuous apparatus for withdrawing an extract from a solid by intermittently directing hot solvent under high pressure against the solid.

Another object is to provide an extraction apparatus for use in a continuous extraction process.

Another object ist to provide an extraction apparatus having an improved solvent flow controlling device.

These and other objects and advantages of the present invention will become apparent from the following description and the accompanying drawings, in which:

FIG. 1 is a diagrammatic elevation of the continuous pressure processing system of the present invention.

FIG. 2 is a fragmentary elevation of a screw conveyor showing the solvent flow controlling device in a flow restricting position.

The continuous pressure extracting system of the present invention may be used for many purposes. For example, it is ideally suited for extracting solids used in the manufacture of instant coffee, and is equally effective in the extraction of tanbark and bone.

The continuous pressure extracting system of the present invention comprises an inclined pressure vessel 4 (FIG. 1) having a cylindrical bore 5 and a screw conveyor 6 rotatably mounted in the bore 5 and extending the full length thereof. A pressure, feed valve 7 is secured to the upper wall of the pressure vessel 4 adjacent the lower end and communicates with the vessel 4 through an opening 8. Similarly, a pressure, discharge valve 9 is secured to the lower wall of the vessel 4 adjacent its upper end and communicates with the vessel 4 through an opening 10. Both of these valves are of a well known rotary type such as that disclosed in the United States Letters Patent 2,638,137 which issued to William deBack on May 12, 1953. Each of these valves includes a rotor having pockets which move the solid material into or removes the extracted solids from the vessel 4 with a minimum loss of pressure from the vessel 4.

The screw conveyor 6 includes a tubular shaft 11 (FIG. 2), which serves as the entrance conduit for the solvent, and which has a solid spindle 12, secured to the lower end thereof, that is journaled in a lower end cap 13 of the pressure vessel 4. An upper tubular spindle 14 is secured in fluid tight engagement to the upper end of the tubular shaft 11 and is journaled in an upper end cap 16 of the vessel 4. A continuous spiral screw 17 is wound around and is welded to the tubular shaft 11 and, upon being driven the screw agitates and moves the solid material upwardly along the lower surface of the vessel 4 in a well known manner. A disc 18 having a peripheral edge which is beveled toward the lower end cap 13 is secured to the lower end of the tubular shaft 11 and to the lower end of the spiral screw 17. The disc 18 is concentric with the pressure vessel 4 and its outer peripheral surface is disposed closely adjacent the surface of the bore 5 thereby preventing the solid material from gravitating down the inclined vessel 4 past the disc 18, but allowing liquid which collects in the bottom of the vessel 4 to flow therepast. A plurality of spaced, longitudinally aligned discharge ports 19 in the tubular shaft 11 have fan-shaped spray nozzles 21 communicating therewith. The spray nozzles 21 are aligned with the axis of the shaft 11 so that a wide fan of solvent will be ejected therefrom to intermittently wash the solid material as it passes thereunder.

A solvent flow control device 23 is provided for the purpose of controlling the amount of solvent entering the pressure vessel 4 from the tubular shaft 11. The flow control device 23 comprises a piston 24 which is slidably received in the tubular shaft 11 and is controlled by a rod 26 which projects out of the tubular shaft 11 through the tubular spindle 14. O-rings 27 are seated in grooves in the piston 24 and provide a fluid seal between the piston 24 and the inner wall of the tubular shaft 11. The rod 26 is slidably received in the tubular spindle 14 and in a swivel joint 28 (FIG. 1) of standard design, to which the rod 26 is sealed by means of an O-ring or the like (not shown). When the rod 26 is moved to the left (FIG. 2), so that the piston 24 is on the left side of the lowest nozzle 21, solvent which flows into the spindle 14 and shaft 11 through the swivel joint 28 will flow out of all of the nozzles 21. If less than the maximum amount of solvent is desired, the solvent is prevented from flowing out of the lower nozzles 21 by pulling the piston 24 upwardly, by means of the rod 26, to a point above as many of the lower nozzles 21 as necessary to provide the desired, restricted flow from the upper nozzles. Any suitable means may be used to hold the rod in adjusted position.

Although different solids and solvents may be used with the apparatus of the present invention, the apparatus is ideally suited for extracting or withdrawing an extract from ground coffee using hot water as the solvent. This particular application will now be described, having particular reference to FIG. 1.

A pump 31 receives water from any suitable source and directs the water at approximately 150 p.s.i. through a heat exchanger 32. Steam, received from a boiler (not shown), is used as the heating medium in the heat exchanger 32. The amount of steam entering the heat exchanger 32 is controlled by an automatic pressure sensitive valve 33 which is regulated by a temperature controller 34 communicating with the discharge line 36 from the heat exchanger 32. A liquid level controller 37 communicates with the vessel 4 and is connected to an automatic control valve 38 in the discharge line 36 for the purpose of stopping the flow of hot water in the discharge line 36 if the level of liquid in the vessel 4 should exceed a predetermined height. A water meter 39 is connected to the discharge line 36 for the purpose of determining the exact amount of water being used. An impulse control valve 41 is connected in the discharge line 36 between the water meter 39 and the swivel joint 28 that is connected to the tubular spindle 14. The impulse control valve 41 is a normally closed, solenoid operated valve and is controlled by a switch 42 which has an actuator 43 disposed in position to contact and ride against the surface of a cam 44. The cam 44 is formed on a sprocket 46 which is keyed on the spindle 14 and is connected to any suitable source of power for driving the screw conveyor 6. The cam 44 has an arcuate lobe 47 which is aligned with the nozzles 21 and is arranged to actuate the switch 42 to open the impulse valve 41 only when the nozzles are directed downward and are moving through a predetermined portion of their lower range of travel. In this way, the ground coffee is intermittently washed by a high pressure stream of hot water as the coffee is being agitated and conveyed thereunder by the screw conveyor 6.

In order to increase the rate of extraction, steam at approximately 100 p.s.i. is directed into the vessel 4 through a conduit 51 connected thereto and to a source of steam under pressure. An automatic steam control valve 52 is connected in the conduit 51 and is controlled by a temperature controller 52a, which is connected between the valve 52 and the vessel 4. To prevent an excessive buildup of pressure in the vessel 4, a vent valve 53 is connected to the vessel 4 and is controlled by an automatic pressure valve 54 that is connected to the vent valve 53 and to the vessel 4.

The solution of solvent and extracted material is collected in the lower end of the vessel 4 in a pool having an upper surface indicated by the line 56. This solution is drained from the vessel 4 through a conduit 57 which communicates with the lower end cap 13. An automatic concentration controller 58 communicates with the vessel through the end cap 13, and is connected to a valve 58a in the conduit 57 for the purpose of opening the valve 58a when the concentration of extract in the solution is above a predetermined minimum. During normal operation, this valve 58a remains open since the concentration of the solution will be controlled by the solvent flow control device 23 (FIG. 2). The solution flows through the conduit 57 into a settling chamber 59 where heavy foreign material settles out and is periodically removed therefrom. The solution then flows through a filter 61, which further purifies the solution, and into a cooler 62 which cools the solution to a temperature below that of the boiling point of water at atmospheric pressure. Coolant, such as cold water, flows into the cooler 62 through a conduit 63 and out of the cooler through a conduit 64. The cooled solution flows out of the cooler 62, through a flow meter 66, and through a conduit 68 to other structure which further processes the solution to remove the extract therefrom in the desired form, such for example, as in a powder.

In operating the apparatus of the present invention for the particular application of removing an extract of coffee from ground coffee beans, the feed valve 7, discharge valve 9 and screw conveyor 6 are continuously driven by drive means (not shown). The constant supply of ground coffee is fed into the vessel 4 through the feed valve 7 and is discharged into a pool of water in the lower portion of the vessel. The water, which is the solvent in this particular application, is maintained at a pressure of approximately 150 p.s.i. by the pump 31 and is heated to a temperature between 220°–350° F. by the heat exchanger 32. This water is intermittently directed into the vessel 4 through the nozzles 21 under control of the impulse control valve 41. Steam is directed into the vessel 4 in order to maintain the pressure in the vessel at approximately 100 p.s.i. which high pressure, when combined with the high water temperature, is effective to increase the rate of extraction. Since the water enters the vessel at a pressure which is approximately 50 p.s.i. higher than the pressure within the vessel 4, and since this water is directed into the coffee grounds, which grounds are agitated and advanced thereunder by the screw conveyor 6, the entering water is effective to apply a high pressure washing operation to the grounds to thereby wash a greater percentage of the extract from the coffee grounds without lowering the concentration of the resulting solution. This solution flows from the vessel 4 through the settling chamber 59, filter 61, cooler 62, flow meter 66 and out of the apparatus to be reduced to the desired form by other processing equipment (not shown). The extracted coffee solids are conveyed into the rotary discharge valve 9 by the screw conveyor 6 and are discharged therefrom and from the apparatus without substantial loss of pressure.

It is to be noted that the amount of solvent entering the vessel 4 can easily be reduced by moving the rod 26 (FIG. 2) and piston 24 to the right (FIG. 2) thereby closing certain of the nozzles 21. Likewise, the solvent flow can be increased by moving the piston 24 to the left (FIG. 2) to open more of the nozzles.

Although the processing system shown in FIG. 1 includes only one vessel 4 and associated parts, it is to be understood that several of the systems shown in FIG. 1 may be connected in series so that the solid extract of the first system becomes the feed solid of the second system. In this way a solution of very high concentration may be removed from the first system while solutions of progressively lesser concentration will be removed from the following systems.

It is apparent from the foregoing description that the improved apparatus of the present invention includes means for intermittently discharging solvent at high pressure against the solid from which material is to be extracted to effect a physical washing of extract from the product. This intermittent washing takes place in a high pressure and high temperature atmosphere which increases the rate of extraction, and since the intermittent high pressure washing adds solvent at a slow rate to the vessel, the resulting solution contains a higher percent of extract than obtained from other extracting apparatus.

While one embodiment of the present invention has been shown and described, it will be understood that various changes and modifications may be made without departing from the spirit of the invention or the scope of the appended claims.

The invention having thus been described, what is believed to be new and desired to be protected by Letters Patent is:

1. An apparatus for withdrawing an extract from a solid which comprises an inclined pressure vessel, feed means connected to the lower end portion of said vessel for feeding the solids from which extract is to be withdrawn into said vessel with a minimum loss of pressure from said vessel, a continuously driven screw conveyor in said vessel for agitating and elevating the material therein, said conveyor having a tubular shaft, discharge means connected to the upper end portion of said vessel for discharging the extracted solids from said vessel with a minimum of loss of pressure from said vessel, means for directing steam into said vessel to maintain an atmosphere therein at approximately 100 p.s.i., a plurality of aligned spray nozzles disposed at intervals spaced longitudinally on said tubular shaft, means connected to said tubular shaft for supplying hot solvent to said tubular shaft at approximately 150 p.s.i. only when said spray nozzles are directed downwardly toward the solids, said solvent supply means comprising an electrically operated valve having an open and closed position respectively blocking and allowing passage of liquid into said tubular shaft, a cam operated electric switch connected to said electrically operated valve to actuate said valve, and a cam mounted on said tubular shaft and intermittently engageable with said switch during rotation of said shaft for opening and closing said valve, a piston slidably received in said tubular shaft, a control rod connected to said piston and projecting out of one end of said shaft, said rod being operable to slide said piston longitudinally in said tubular shaft to selected positions relative to said nozzles whereby only those nozzles which are disposed between said piston and said hot solvent discharge means will spray solvent into said vessel, and means for withdrawing the solution of concentrate and extract from the lower end of said vessel.

2. An apparatus for withdrawing an extract from solids such as tanbark, bone, ground coffee and like solids, comprising an inclined pressure vessel, feed means connected to the lower end portion of said vessel for feeding the solids from which extract is to be withdrawn into said vessel with a minimum loss of pressure from said vessel, a continuously driven screw conveyor in said vessel for agitating and elevating the material therein while moving the solids along a predetermined path, said conveyor having a tubular shaft, discharge means connected to the upper end portion of said vessel for discharging the extracted solid from said vessel with a minimum of loss of pressure from said vessel, means for directing steam into said vessel to maintain an environmental pressure therein substantially above atmospheric pressure, a plurality of aligned spray nozzles disposed at intervals spaced longitudinally on said tubular shaft, said screw conveyor continuously moving said solids past said nozzles, solvent supply means for directing a solvent useable with said solids at a pressure greater than said environmental pressure into one end of said shaft for discharge through said nozzles in a high pressure spray, a slidable piston in said tubular shaft, control means connected to said piston for sliding said piston longitudinally in said tubular shaft to selected positions relative to said nozzles whereby only those nozzles which are disposed between the piston and said one end of said shaft will be effective for discharging solvent into said vessel, valve means in said solvent supply means having open and closed positions for respectively blocking and allowing the flow of liquid into said effective nozzles for causing an intermittent discharge of liquid from said effective nozzles onto the solid continuously moving therepast, means operatively associated with said shaft for normally maintaining said valve means closed and for opening said valve means once for each revolution of said shaft at fixed intervals of time and only when said nozzles are directed downwardly toward the solid below said shaft for washing the solute from the solid and for providing a maximum recovery of soluble solids while using a minimum quantity of solvent, and means for removing the solution of solvent and extract from said pressure vessel.

3. An apparatus for withdrawing an extract from solids such as tanbark, bone, ground coffee, and like solids, comprising a pressure vessel, feed means connected to one end portion of said vessel for feeding the solids from which extract is to be withdrawn into said vessel with a minimum loss of pressure from said vessel, discharge means connected to the other end portion of said vessel for discharging the extracted solids from said vessel with a minimum loss of pressure from said vessel, means for subjecting the confined solids to an environmental pressure greater than atmosphere pressure, a continuously driven screw conveyor for continuously moving the material along a predetermined path between said feed means and said discharge means, said conveyor having a tubular shaft, means defining a plurality of aligned spray nozzles disposed at intervals spaced longitudinally of said shaft, said screw conveyor continuously moving said solids past said nozzles, solvent supply means for directing a solvent useable with said solid at a pressure greater than said environmental pressure into one end of said shaft for discharge through said nozzles in a high pressure spray, a slidable piston in said tubular shaft, control means connected to said piston for sliding said piston longitudinally in said tubular shaft to selected positions relative to said nozzles whereby only those nozzles which are disposed between the piston and said one end of said shaft will be effective for discharging solvent into said vessel, valve means in said solvent supply means having open and closed positions for respectively blocking and allowing the flow of liquid into said effective nozzles for causing an intermittent discharge of liquid from said effective nozzles onto the solid continuously moving therepast, means operatively associated with said shaft for normally maintaining said valve means closed and for opening said valve means once for each revolution of said shaft at fixed intervals of time and only when said nozzles are directed downwardly toward the solid below said shaft for washing the solute from the solid and for providing a maximum recovery of soluble solids while using a minimum quantity of solvent, and means for removing the solution of solvent and extract from confinement.

References Cited by the Examiner

UNITED STATES PATENTS

| 1,024,230 | 4/1912 | Turner | 23—270 X |
| 1,163,635 | 12/1915 | Baldwin | 239—563 X |
| 1,834,577 | 12/1931 | Cline | 23—270 X |
| 2,517,073 | 8/1950 | Alvarez | 99—289 |
| 2,528,843 | 11/1950 | Poor | 137—624.13 X |
| 2,561,786 | 7/1951 | Davis | 137—624.13 X |
| 2,692,502 | 10/1954 | Warren | 222—482 X |
| 2,907,640 | 10/1959 | Konig | 23—270 |

FOREIGN PATENTS

| 846,532 | 9/1939 | France. |

NORMAN YUDKOFF, *Primary Examiner.*

S. EMERY, *Assistant Examiner.*